March 15, 1927.
W. N. VANCE
FENDER RACK
Filed March 20, 1920     3 Sheets-Sheet 3
1,620,841
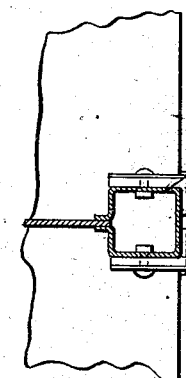
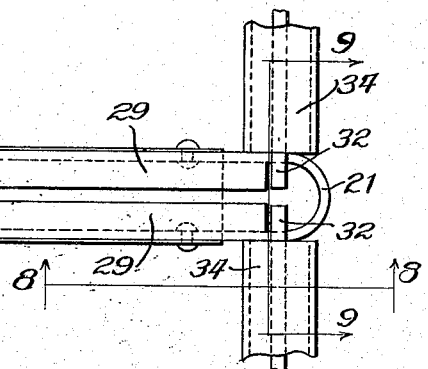
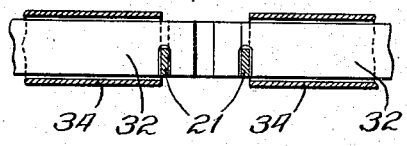
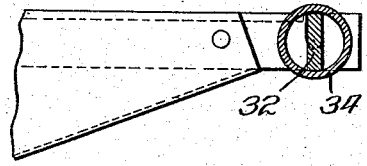
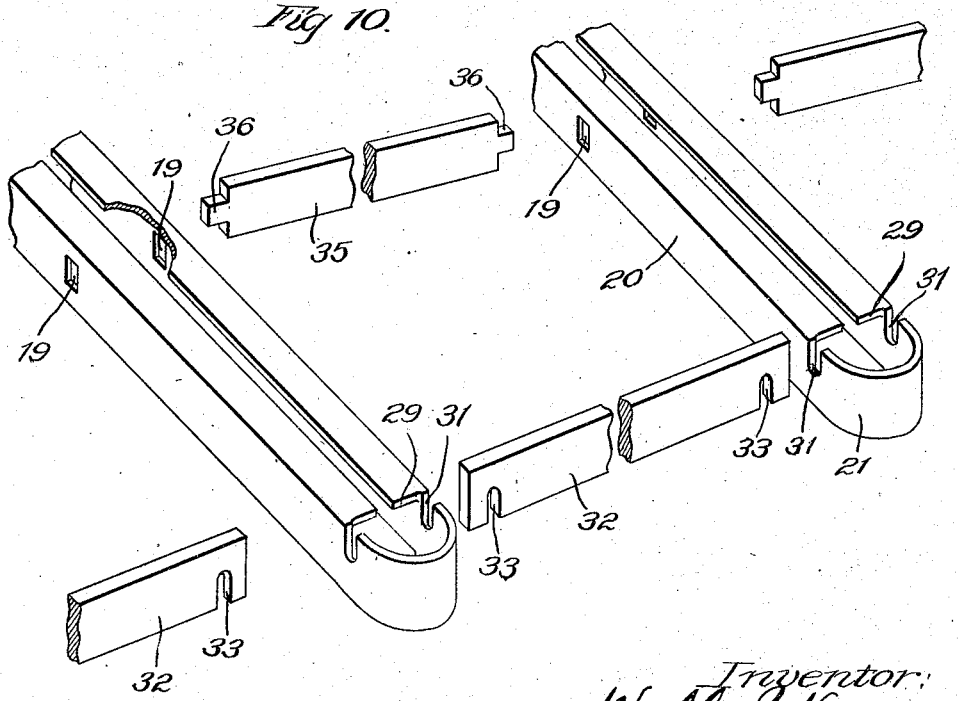

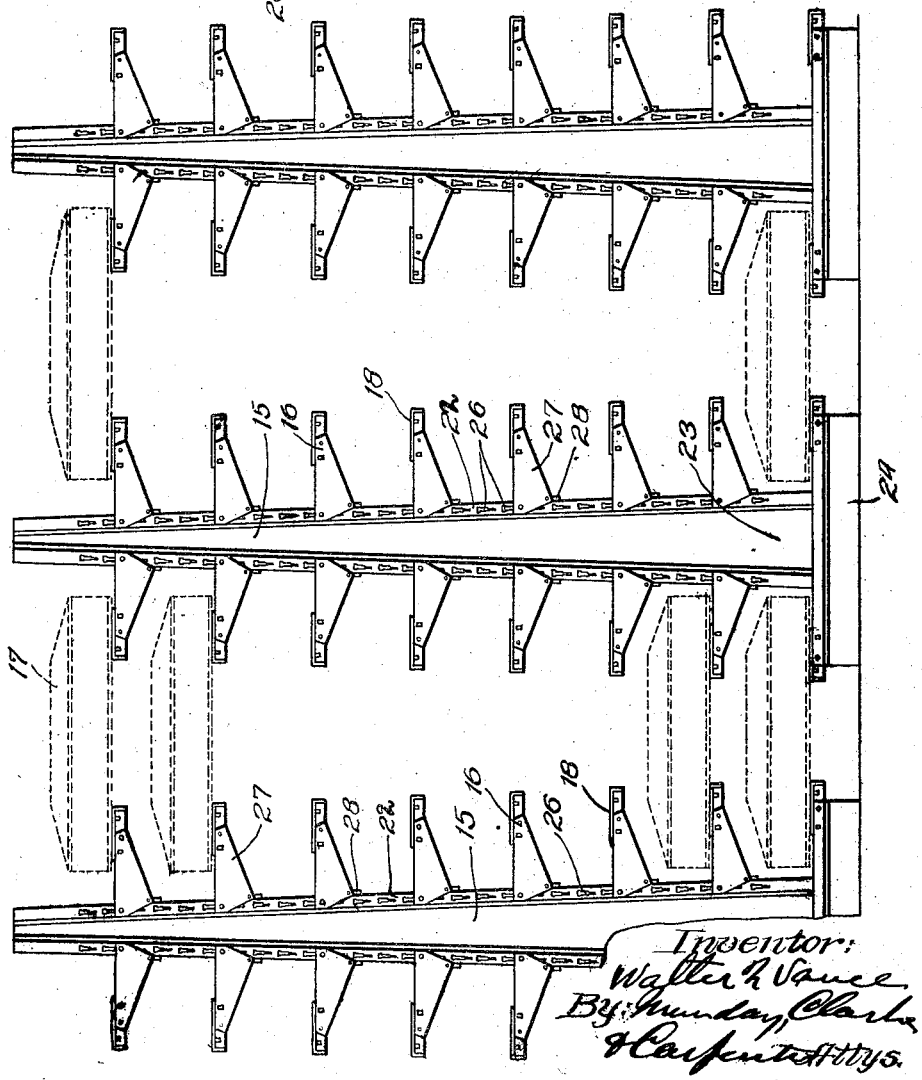

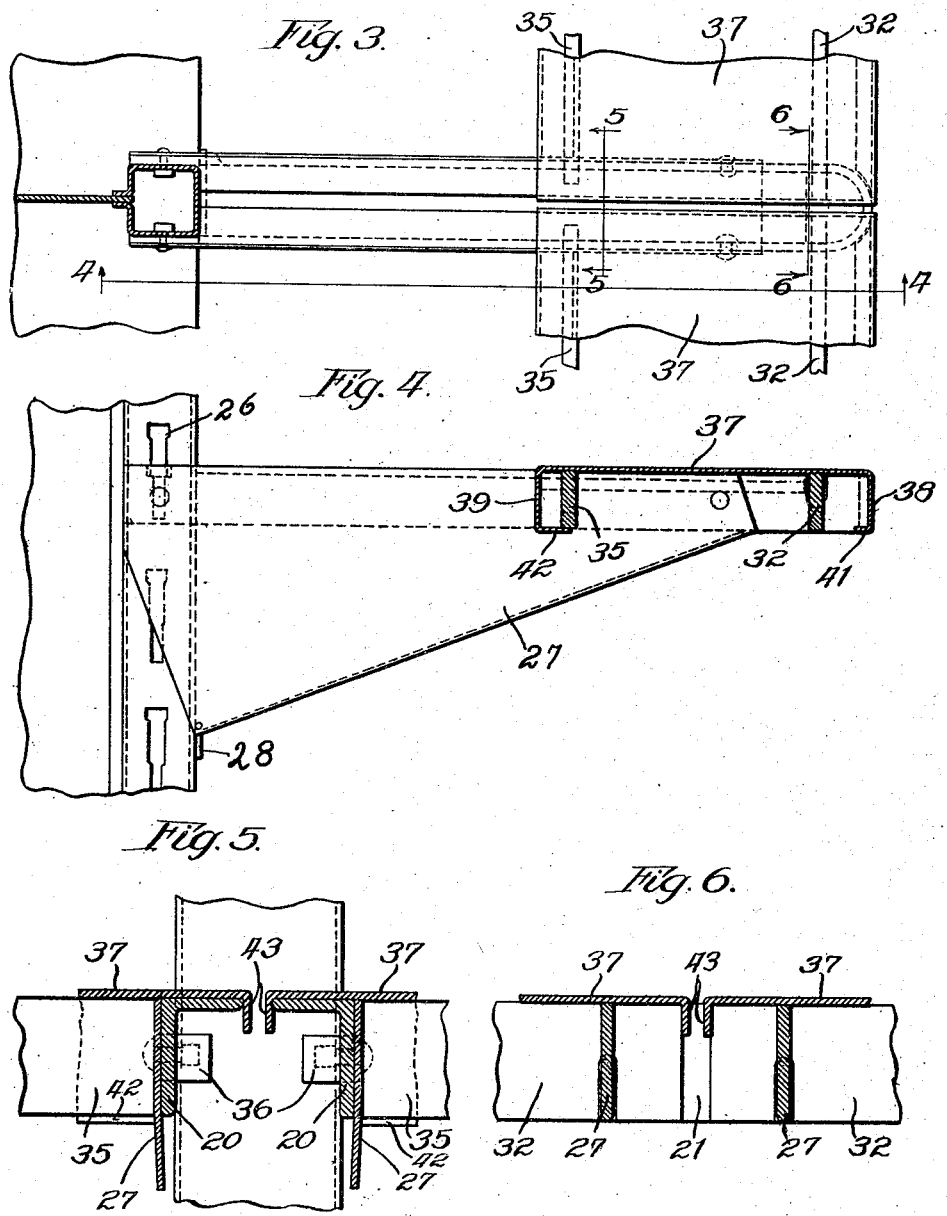

Patented Mar. 15, 1927.

1,620,841

UNITED STATES PATENT OFFICE.

WALTER N. VANCE, OF CHICAGO HEIGHTS, ILLINOIS, ASSIGNOR TO DURAND STEEL LOCKER COMPANY, OF CHICAGO, ILLINOIS, A CORPORATION OF ILLINOIS.

FENDER RACK.

Application filed March 20, 1920. Serial No. 367,563.

This invention relates in general to shelf and rack constructions and while it has more particular reference to the provision of simple, cheap and strong racks for the supporting and storing of bulky articles, as automobile fenders and the like, it will be readily apparent that certain features of it have valuable use in other connections.

A principal object of the invention is the provision of an adequate and strong rack construction for the storing of such bulky articles as automobile fenders and the like, which will require relatively little material and which will permit of ready reassembling or readjustment as occasion may require.

Another important object of the invention is the provision of a rack for automobile fenders and the like which will permit the fenders to be arranged in easy accessible position and which will require a minimum of floor space both when fenders and the like are in position for storing and when the racks are empty.

Another important object of the invention is the provision of a rack of this character which may be conveniently used for the storing of other articles, as for example bars, rods and the like, and in fact for smaller articles without requiring material readjustment or change in the character of the assembly.

Numerous other objects and advantages of the invention will be apparent as it is better understood from the following description, which taken in connection with the accompanying drawings discloses a preferred embodiment thereof.

On the drawing,

Figure 1 is an end view of a rock construction embodying my present invention;

Fig. 2 is a side elevation of a portion of the same;

Fig. 3 is a section taken substantially on the line 3—3 of Fig. 2;
Fig. 4 is a section taken on the line 4—4 of Fig. 3;

Figs. 5 and 6 are sections taken on the lines 5—5 and 6—6 of Fig. 3;

Fig. 7 is a section taken similarly to Fig. 3 showing a somewhat different arrangement;

Fig. 8 is a section taken substantially on the line 8—8 of Fig. 7;

Fig. 9 is a section taken substantially on the line 9—9 of Fig. 7; and

Fig. 10 is a perspective detail view of a portion of the construction as arranged in Figs. 1 to 6.

For the purpose of illustrating my invention I have shown on the drawing a rack construction in which automobile fenders or the like may be stored. A number of duplicated units comprising uprights 15, from which cantilever arms extend out at the sides, are arranged in spaced-apart parallel relation and so that the ends of fenders 17 may rest upon cross-supports or connections extending between the ends of the cantilever arms, which ends and connections are shown as provided with shelves 18 in Fig. 1. The fenders each have an end supported by a unit at one side and the other end supported by the next adjacent unit. That is to say, the fenders are laid upon the cross-connections of cantilever arms extending toward each other and into the space between adjacent uprights or units.

The frames, including the uprights, will not, it is believed, need particular description since they are substantially the same as those shown and described in my companion application for shelf and rack construction disclosed in my prior Patent 1,560,122 of November 3, 1925, and the same is also true of the cantilever arms employed except that such cantilever arms are preferably provided intermediate their ends with apertures 19 in the vertical flanges 20 of the angle member 21, which forms a part of each arm. It might, however, be well to state that the uprights comprise slotted rectangular tubes 22 connected by webs 23 and supported upon a base 24 which extends out to or beyond the ends of the cantilever arms when in position. The uprights are connected by suitable braces and cross members indicated at 12 on the drawing. The cantilever arms each consist of an angle member bent at its center to provide legs adapted for disposal at the sides of the tubes and to be engaged with the slots 26 therein provided. These angle members are embraced by a metal sheet 27 carrying a bearing member 28 for engagement with the forward face of the tube.

In order to permit the double angle arms to be bent the horizontal flange is cut away at the end of each arm at 29 and slots 31 are provided in the vertical flange. A crossbar or support 32, having slots 33 in its under face, is adapted to extend between adjacent arms and to be moved down with the slots 31 and 33 in registration to form an interlocking connection. So much of the construction as has just been described is illustrated and also described in my co-pending application already mentioned.

In order that the fenders or other articles may rest upon and extend between adjacent units without engaging any sharpened edges likely to mar their finish, I provide a bearing member at each side for them to rest upon. This bearing member may consist of a mere tube or pipe 34 as is illustrated in Figs. 7 to 9 and adapted to embrace or be disposed about the cross-connection 32 and to extend from one cantilever arm to the next. When this form of bearing member is used the shelf or rack construction of my earlier mentioned application may be employed without other change than the removing of the shelves and the positioning of the tubes 34 about the connections 32. I, however, prefer to provide a flatter and more extended bearing for the articles supported and to this end I have provided additional cross-connecting members 35 provided with tongues 36 at their ends, which tongues are adapted for insertion in the apertures 19, already mentioned. In assembling the construction the members 35 are positioned before the members 32. The members 32 are then incorporated in the assemblage locking the parts together. Relatively narrow shelves of sheet metal are provided to rest upon the cross connections 32 and 35 and to have interlocking relation therewith and each comprises a shelf body part 37 having downwardly extending flanges 38 and 39 at the longitudinal edges. The front flange 38 is preferably bent in at the bottom at 41 to dispose it in the plane of the bottom edges of the angle member 21 of the cantilever arm and of the cross-supports or connections 32. The bottom edge 42 of the rear or inner flange 39 is preferably bent in to extend under and beneath the bottom edge of its cross connection 35. The ends of the shelf body are preferably turned down to form flanges 43 extending down in between the horizontal flange portions of the angle iron members of the cantilever arms. To assemble the shelf 37, the bottom edge 42 of the rear or inner flange 39 is hooked behind the cross connecting member 35. The flanges 43 are inserted between the horizontal flange portion of the cantilever arms and the flange 38 is then fastened down over the end of the arm.

It will be noted (Fig. 4) that the forward end of the flange 43 engages the cross connector 32 and that the parts when assembled are in interlocked relation and provide a substantially rigid unit.

It will be manifest that this shelf construction may conveniently be used for the carrying of bars, rods and the like and also for the storing of smaller articles upon the shelf part in front of the bar or rod supporting parts. The slots in the uprights and the construction of the cantilever arms are such as to permit of adjustment of the parts to meet widely varying requirements and since the larger objects, as fenders and the like, are supported at the two ends, the units may be separated as widely apart as is possible while permitting the ends of such articles to have full bearing, the weight being thus concentrated at the ends and transmitted vertically downwardly well within the base of the units involved.

It is thought that the invention and many of its attendant advantages will be understood from the foregoing description, and it will be apparent that various changes may be made in the form, construction and arrangement of the parts without departing from the spirit and scope of the invention or sacrificing all of its material advantages, the form hereinbefore described being merely a preferred embodiment thereof.

I claim:

1. In a shelf or rack construction, the combination of uprights spaced apart, a cantilever arm extending from each upright so as to provide spaced horizontal, parallel, supports therefrom, each of said arms consisting of a metal member returned upon itself, a cross-support connected to the substantially extreme outer ends of said arms, a second cross-support extending between said arms at a point substantially midway between the ends of said arms and the point of attachment of said arms to said uprights, a shelf member having a downwardly bent flange underlying forward portions of said cantilever arms, the opposite end of said shelf member having a downwardly bent flange provided with a forward lip, which lip is adapted to underlie said second cross-support, thereby holding said shelf member firmly resting on said two cross-members and bridging the space between the two cantilever arms.

2. In a shelf or rack construction, the combination of two spaced uprights, a cantilever arm extending horizontally from each so as to provide two parallel spaced apart arms, each arm comprising an angle member returned upon itself whereby to form a folded outer arm portion with two spaced apart angle portions, the angle portions at their inner ends being connected to the upright, the outer extremity of each cantilever arm having its angle portions provided with vertical slots, and each angle portion of a cantilever arm having registering perforations located substantially at a point intermediate their lengths, a cross-support having open ended slots adapted to fit in the vertical slots on the outer ends of the cantilever arms and a second cross-support having projecting lugs adapted to fit in the registering apertures of the angle arms, the upper portion of said second cross-support lying substantially flush with the top surface of the angle arm; and a sheet metal shelf member having oppositely disposed downwardly extending flanges terminating in inwardly extending bottom edges, one of said edges adapted to underlie the forward folded portion of said cantilever arm and the opposite under edge being adapted to underlie the under surface of said second cross-support, whereby said shelf is maintained in position, bridging the space between said cantilever arms.

WALTER N. VANCE.